(12) United States Patent
Bennett

(10) Patent No.: US 6,967,425 B1
(45) Date of Patent: Nov. 22, 2005

(54) MULTI-FUNCTIONAL ELECTRIC STEPPER MOTOR ASSEMBLY HAVING INCREASED MOTOR TORQUE

(75) Inventor: Allen Bennett, San Diego, CA (US)

(73) Assignee: IMS Inc., Malborough, CT (US)

( * ) Notice: Subject to any disclaimer, the term of this patent is extended or adjusted under 35 U.S.C. 154(b) by 26 days.

(21) Appl. No.: 10/888,874

(22) Filed: Jul. 12, 2004

(51) Int. Cl.[7] .................. H02K 1/22; H02K 37/00; H02K 21/00
(52) U.S. Cl. .............. 310/216; 310/217; 310/49 R; 310/261
(58) Field of Search ................. 310/216, 217, 310/261, 49 R, 156.08

(56) References Cited

U.S. PATENT DOCUMENTS

| | | | | |
|---|---|---|---|---|
| RE31,950 E | * | 7/1985 | Binns | 310/156.08 |
| 4,542,313 A | * | 9/1985 | Di Pietro | 310/65 |
| 6,002,186 A | * | 12/1999 | Coutu et al. | 310/49 R |
| 6,201,334 B1 | * | 3/2001 | Sargeant et al. | 310/254 |

* cited by examiner

*Primary Examiner*—Tran Nguyen

(57) ABSTRACT

An electric stepper motor having increased motor torque includes a thru-hole, a rotor and a stator. The thru-hole allows use with a chamber and provides transport of hardware and elements into the chamber. A first and second pair of rotor cups separated by a non-magnetic spacer disc provide increased motor torque.

5 Claims, 3 Drawing Sheets

MULTI-FUNCTIONAL ELECTRIC STEPPER MOTOR ASSEMBLY HAVING INCREASED MOTOR TORQUE

BACKGROUND OF THE INVENTION

There exists a need in motion control applications for the use of stepper motors as through-hole motors in semiconductor, manufacturing and medical processes that use light emitted by lasers, radar positioning pedestals, and environmentally controlled chambers. Current step motor designs do not easily adapt to such through motor applications without substantial modification.

One example of a stepper motor having an internal opening is found in U.S. Pat. No. 6,002,186 entitled Electrical Stepper Motor Having a Cylindrical Magnetic Rotor within a Pair of Cups of Magnetic Material".

The advent of such a stepper motor having an internal opening for semiconductor, manufacturing and medical applications, has occasioned demand for such motors having higher power applications, not achievable by the power rating of the aforementioned U.S. Pat. No. 6,002,186.

One purpose of the invention is to describe a stepper motor having an internal opening through the center of the motor with increased motor torque efficiency. The motor includes means for providing increased power capacity without interfering with the internal opening advantages.

SUMMARY OF THE INVENTION

An electric stepper motor with increased motor torque includes a thru-hole, a rotor and a stator. The stator is internally arranged within the rotor assembly and the rotor assembly consists of a permanent magnet with a first pair of rotor cups and a second pair of rotor cups. The first and second pair of rotor cups are separated via a non-magnetic spacer. The thru-hole allows use with a chamber and provides transport of hardware and elements into the chamber.

DESCRIPTION OF THE PREFERRED EMBODIMENT

Figure 1:
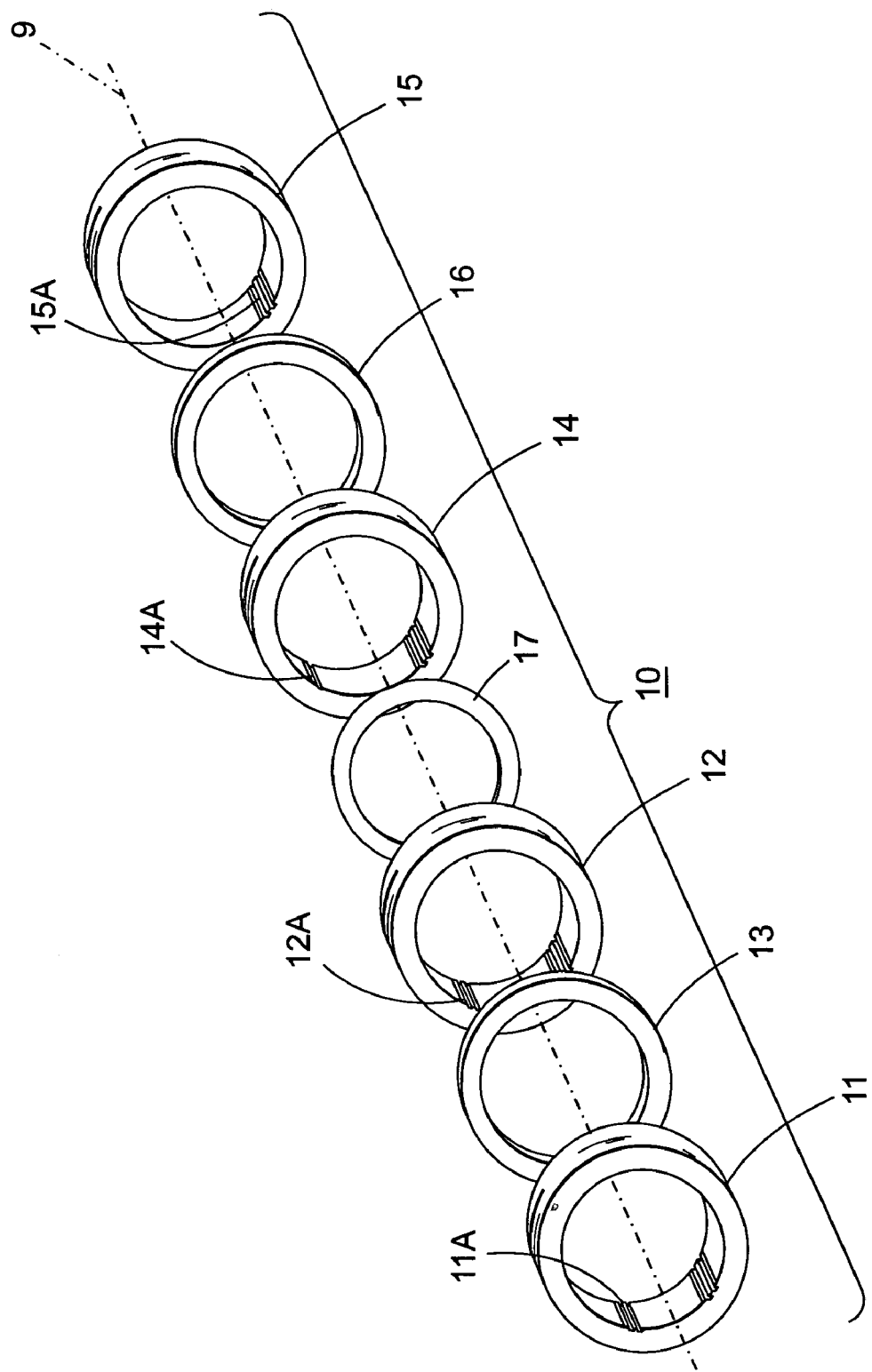
FIG. 1 is a front perspective view of the rotor assembly within the electric stepper motor including a thru-hole and having increased motor torque according to the invention.

FIG. 1 depicts the increased stepper motor torque rotor assembly 10 consisting of a first pair of rotor cups 11, 12 having interior laminations 11A, 12A similar to those described in the aforementioned U.S. Pat. No. 6,002,186 and separated by means of a first thin magnetic cylinder 13. The increased motor torque rotor assembly 10 further includes a second pair of rotor cups 14, 15, having similar interior laminations 14A, 15A separated by a second thin magnetic cylinder 16 and are arranged concentric with a common centerline as shown at 9. The first pair of rotor cups 11, 12 and second pair of rotor cups 14, 15 are in turn separated by means of the non-magnetic spacer disc 17 whereby the resulting first and second magnetic fields (not shown) generated by the first and second pair of rotor cups 11, 12, 14, 15 additively combine to produce increased motor torque without interfering with the individual first and second magnetic fields, per se.

Figure 2:
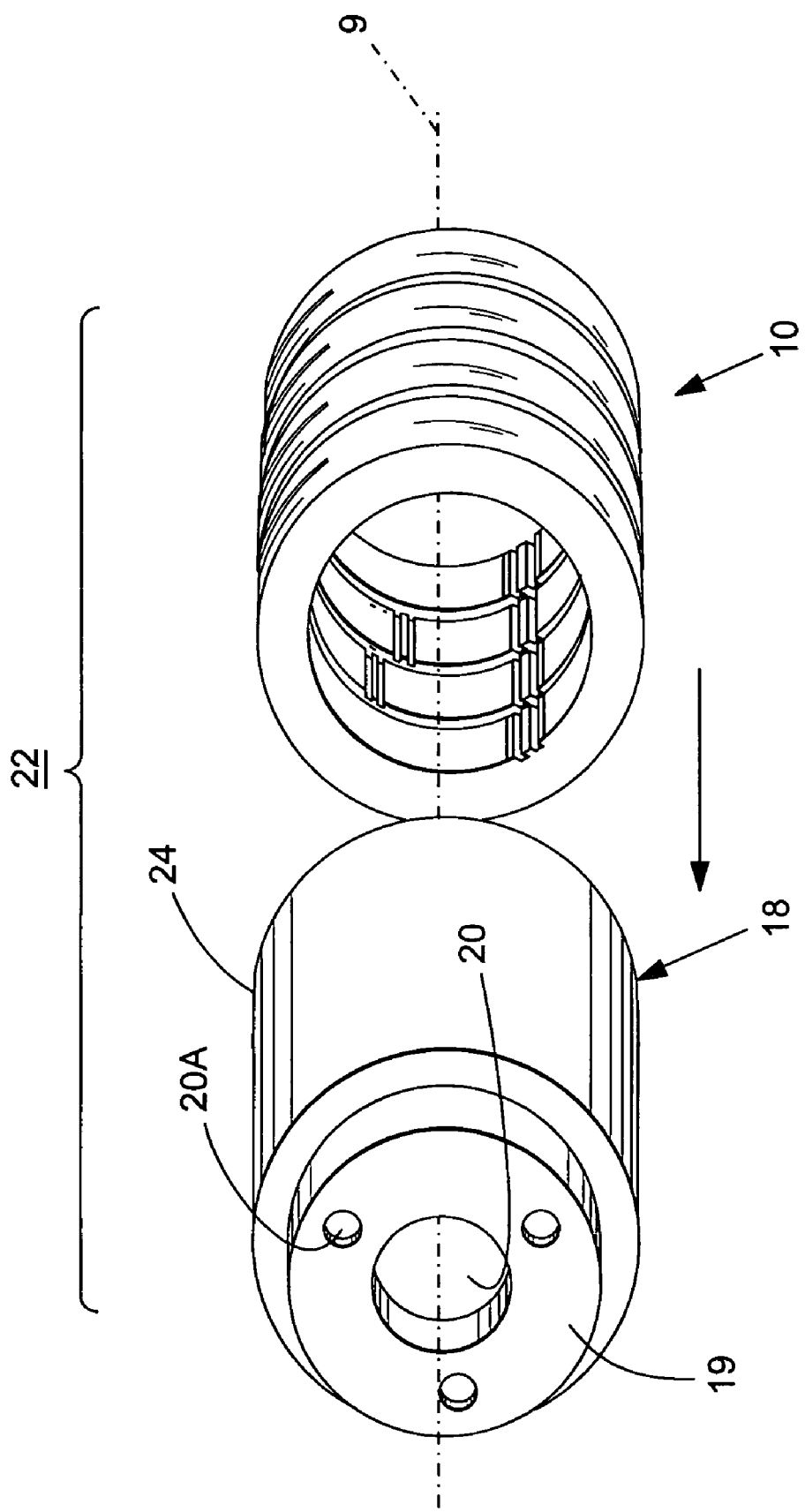
FIG. 2 is a front perspective view of the increased motor torque rotor assembly of FIG. 1 prior to insertion within the motor shaft housing.

Referring now to FIG. 2, the increased torque stepper motor sub-assembly 22 is shown prior to inserting the rotor assembly 10 within the hollow cylinder portion 24 of the increased torque stepper motor shaft housing 18 along the common centerline 9. As further described within the aforementioned U.S. Pat. No. 6,002,186, the motor shaft housing 18 includes a front flange 19 extending from the hollow cylinder portion 24. A central aperture 20 thru the shaft housing 18 allows for passage thru the rotor assembly 10, when inserted therein and holes 20A thru the front flange 19 allow for connection therewith other motor components (not shown).

Figure 3:
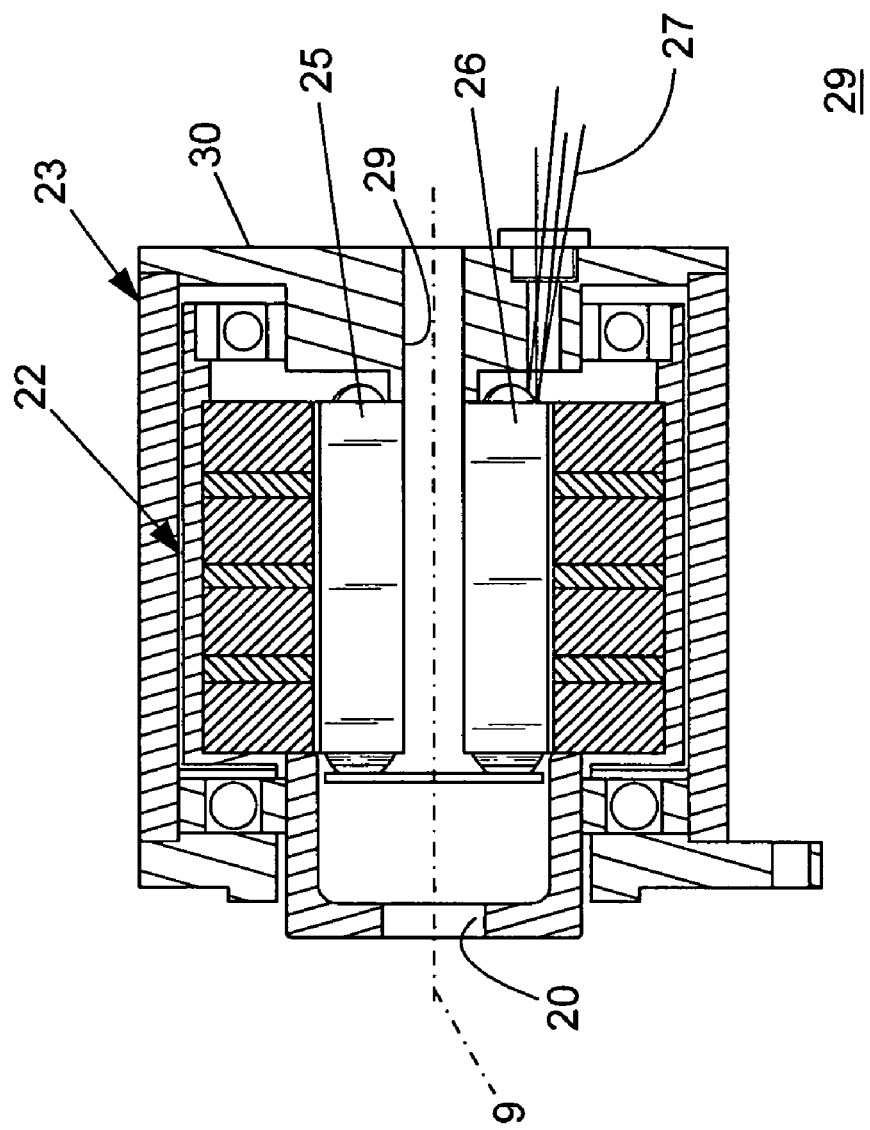
FIG. 3 is a side sectional view of the complete stepper motor including the thru-hole and increased motor torque rotor assembly according to the invention.

The increased torque stepper motor assembly 29, which includes the sub-assembly 22, is shown within the motor housing 23 in FIG. 3, around the motor stator 25, which includes the motor windings 26, accessed by means of conductors 27. It is noted that the rear section 30 of the outer motor housing 23 includes an aperture 29 co-planar with the central aperture 20 along the common centerline 9 to insure access within the increased torque stepper motor assembly 29 in further accordance with the teachings of the invention.

A stepper motor has herein been described having a two-piece rotor assembly for improved torque efficiency along with an interior thru-hole for field-installation of a shaft, air passage or electric wiring and the like. A first and second pair of rotor cups separated by a non-magnetic spacer disc provides increased motor torque.

What is claimed is:

1. A stepper motor sub-assembly comprising:
   a first pair of apertured rotor cups separated by a first hollow magnetic disc; a second pair of apertured rotor cups separated by a second hollow magnetic disc, said second pair of apertured rotor cups aligned with said first pair of apertured rotor cups; and
   a hollow non-magnetic disc intermediate said first pair of apertured rotor cups and said second pair of apertured rotor cups for preventing magnetic interference between said first pair of apertured rotor cups and said second pair of apertured rotor cups.

2. The stepper motor sub-assembly of claim 1 including a motor shaft housing comprising a hollow cylindrical sleeve made of magnetic material; said first pair of apertured rotor cups and second pair of apertured rotor cups rotor cups being positioned within said cylindrical sleeve defining a concentric hollow passage extending between said first and second pair of rotor cups and said cylindrical sleeve.

3. The stepper motor sub-assembly of claim 1 wherein said first and second pair of rotor cups comprise a plurality of circular laminations having a plurality of striations formed on an inner perimeter thereon.

4. The stepper motor sub-assembly of claim 2 wherein said motor shaft housing further includes a front flange attached to said hollow cylindrical sleeve for providing access to said concentric hollow passage.

5. The stepper motor sub-assembly of claim 2 including an apertured stator positioned within said first and second pair of rotor cups.

\* \* \* \* \*